US005161623A

United States Patent [19]

Erlach

[11] Patent Number: 5,161,623

[45] Date of Patent: Nov. 10, 1992

[54] PERCUSSION DEVICE

[75] Inventor: Josef Erlach, Oberzell, Fed. Rep. of Germany

[73] Assignee: Sulzer Brothers Limited, Winterthur, Switzerland

[21] Appl. No.: 637,051

[22] Filed: Jan. 3, 1991

[30] Foreign Application Priority Data

Jan. 15, 1990 [CH] Switzerland .......................... 120/90

[51] Int. Cl.$^5$ ............................................ B23Q 5/033

[52] U.S. Cl. ...................................... 173/14; 173/201; 173/212

[58] Field of Search ................. 173/14, 114, 135, 139, 173/116, 105, 212, 201

[56] References Cited

U.S. PATENT DOCUMENTS

| | | | |
|---|---|---|---|
| 1,093,302 | 4/1914 | Wagner | 173/116 |
| 1,827,877 | 10/1931 | Meeker et al. | 173/14 |
| 1,881,886 | 10/1932 | Norling | 173/135 |
| 1,891,411 | 12/1932 | Greve | 173/135 |
| 2,426,409 | 8/1947 | O'Farrell | 173/135 |
| 3,114,421 | 12/1963 | McCloud | 173/116 |
| 4,732,219 | 3/1988 | Chromy | 173/116 |
| 4,823,886 | 4/1989 | Pyatov | 173/14 |

FOREIGN PATENT DOCUMENTS

| | | |
|---|---|---|
| 2023913 | 11/1971 | Fed. Rep. of Germany . |
| 2461662 | 7/1975 | Fed. Rep. of Germany . |
| 2832169 | 1/1980 | Fed. Rep. of Germany . |
| 2854569 | 6/1980 | Fed. Rep. of Germany . |
| 2854953 | 7/1980 | Fed. Rep. of Germany . |
| 0649604 | 5/1985 | Switzerland . |

*Primary Examiner*—Frank T. Yost
*Assistant Examiner*—Scott A. Smith
*Attorney, Agent, or Firm*—Kenyon & Kenyon

[57] ABSTRACT

The percussion device which can be used as a hammer drill has a drive piston for driving an overhung percussion piston which is mounted between two air cushions. Depending on the percussion travel of the percussion piston, the percussion air cushion is reversed so that a respective partial quantity is passed around the percussion piston to the opposite side by a central bypass. A no-load bypass is also provided to vent the recoil air cushion to the percussion cushion for a no-load condition. A third bypass bridges the drive piston in the top dead center position to communicate an annular chamber to the rear of the drive piston with the percussion cushion.

17 Claims, 3 Drawing Sheets

PERCUSSION DEVICE

Figure 1A:
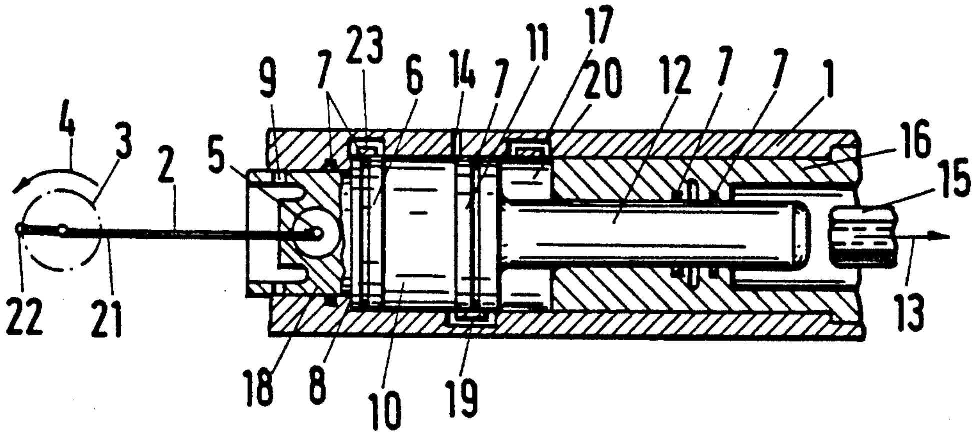

This invention relates to a percussion device and more particularly a hammer drill. As is known, devices have been used for drilling and percussion tools, whether manually guided or on mountings. Patent specifications DE 21 55 689, DE 28 54 569, DE 28 32 169, DE 20 23 913, DE 24 61 662, DE 26 41 070, DE 22 07 962 and DE 31 21 616 disclose percussion devices which, via air cushions, drive a percussion piston which strikes a tool or a tool holder. With regard to the dimensions of these systems, on the one hand, the non-linear spring characteristic and the storage action of air cushions is advantageous, in that the transmitted force can increase to a high value before mechanical contact between the piston surfaces occurs via the cushion. On the other hand, there are limits to the dimensions of pneumatic springs, since when the size of geometrically similar structures increases, the mass of the moving members, such as rams, increases more quickly than the spring forces for transmission of motion. Manufacturers of percussion equipment therefore try to give maximum kinetic percussion energy to a ram at a given rate of percussion, and to keep the transmission and reversing losses small.

It is an object of the invention to provide a transmission system for a percussion device which provides high percussive power with low transmission losses and small space requirements.

It is another object of the invention to provide a percussion device of relatively simple construction for providing a relatively high degree of percussive power.

It is another object of the invention to provide an efficient percussion device for use as a hammer drill for mining purposes.

Briefly, the invention provides a percussion device which includes a drive piston and an overhung percussion piston disposed between a first space facing the drive piston to form a percussion cushion therebetween and a second space to form a recoil cushion therein. The percussion piston may also have a rod extending therefrom for impacting on a tool holder.

In addition, the percussion device has a means in the form of a crank drive or gear for reciprocating the drive piston with a percussion stroke to move towards the percussion piston and a return stroke to move away from the percussion piston.

In accordance with the invention, a central bypass is provided for connecting the first space having the percussion cushion therein with the second space having the recoil cushion therein in order to deliver at least a part of the percussion cushion to the recoil cushion during the percussion stroke with the percussion piston positioned centrally thereof. Also, a central air outlet is provided for selectively communicating the percussion cushion and the recoil cushion to adjustably vent air from the respective cushions.

A further bypass is also provided for connecting the recoil cushion with the percussion cushion at a predetermined no-load position of the percussion piston. This provides for a situation in which a tool holder is not within the percussion range of the percussion piston and reversal of the motion of the percussion piston is to take place.

Still further, a third bypass is provided for connecting an annular chamber defined, in part, by a rear annular surface of the drive piston with the percussion cushion during the return stroke of the drive piston. In addition, the drive piston is formed with a hollow piston rod to define an internal recess while a plurality of openings are provided in the piston rod to communicate this recess with the annular chamber to the rear of the drive piston. In this way, the annular chamber can receive air at the end of the percussion stroke of the drive piston. The construction of the hollow piston rod and the drive piston is such as to form a backing pump connected to the crank drive.

During operation, at least the percussion cushion driving in the impact direction is adapted to be pressurized by the drive piston connected to the crank drive. In addition, a part of the percussion cushion, depending on the percussion travel of the piston, is adapted to be supplied via the central bypass past the percussion piston opposite to the direction of percussion. The amount of air let out for the percussion cushion and the recoil cushion is adjustable via the central air outlet along the travel of the percussion piston.

The advantages of the percussion device are that during a percussion cycle, the system automatically has the non-reversible characteristics of its pneumatic springs (i.e. cushions), in that whenever a piston reaches a given set position, part of the resulting air cushion acts as a work store on the opposite side and increases the compression very quickly compared with the motion of the piston. This results in a high percussion frequency and small dimensions. The percussion output is increased, without adversely affecting the service life of the tool holder (bit). In addition, air is circulated along the moving parts, which solves the problem of lubrication when using an oil mist, e.g. by suction out of the crank case by the backing pump. During a cycle, all chambers are vented to atmosphere, so that small leakages are compensated and do not adversely affect the position of the overhung percussion piston. Also, during the return movement of the working piston, the crank gear delivers work which is transmitted to the percussion piston during the percussion movement.

Figure 1B:
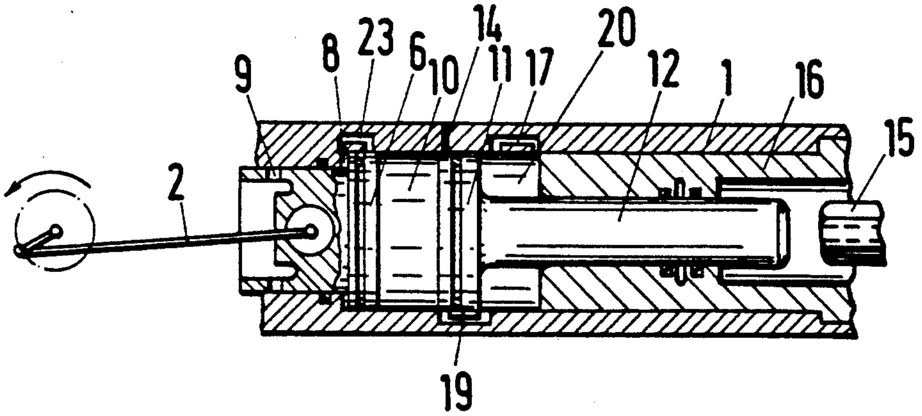
Figure 1C:
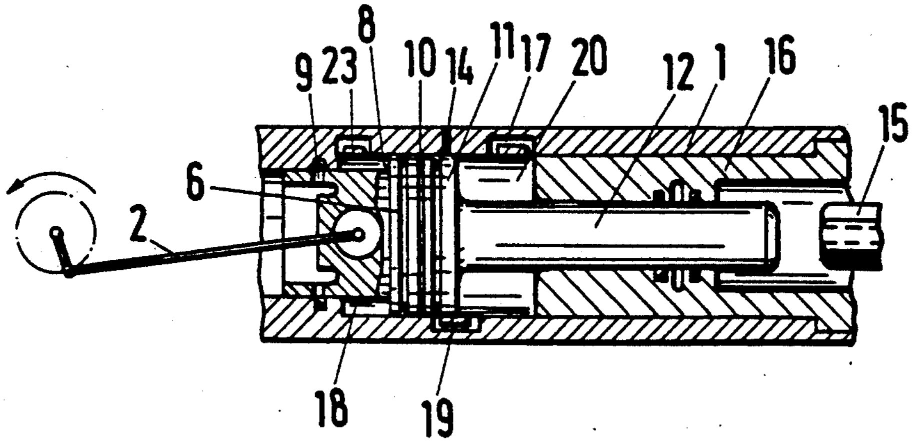
Figure 1D:
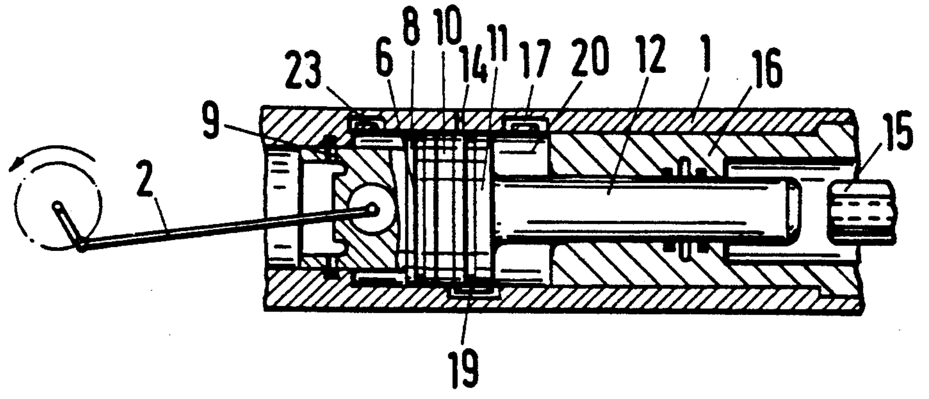
Figure 1E:
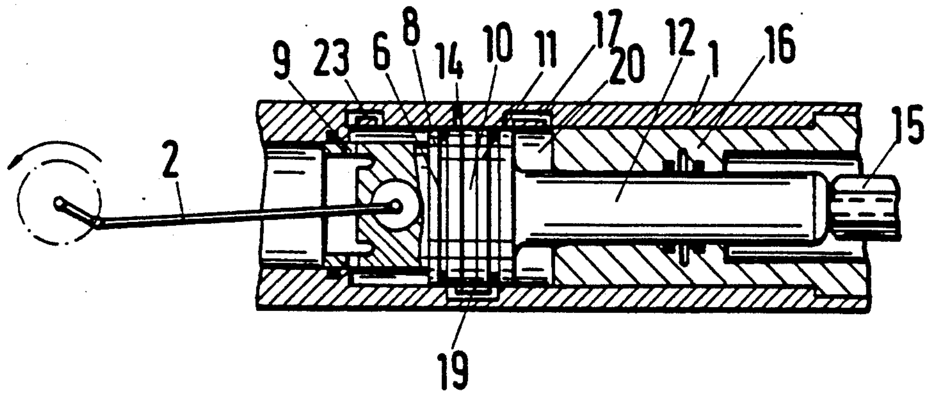
Figure 2:
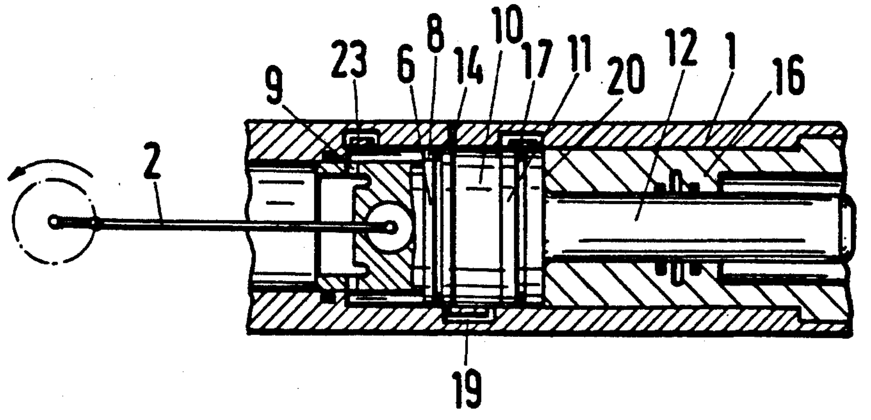

These and other objects and advantages of the invention will become more apparent from the following detailed description taken in conjunction with the accompanying drawings wherein:

FIG. 1A illustrates a diagrammatic view in longitudinal section of a percussion device constructed in accordance with the invention in a bottom dead center of the drive piston;

FIGS. 1B, 1C, 1D and 1E each illustrates a diagrammatic view similar to FIG. 1 of the percussion device in various stages of operation during a percussion stroke in accordance with the invention; and FIG. 2 illustrates a diagrammatic view of the percussion device of FIG. 1A in a top dead center position of the drive piston in accordance with the invention.

Figure 3:
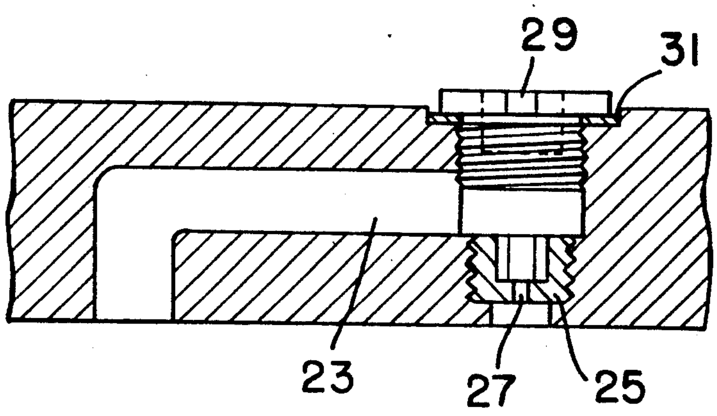

FIG. 3 shows a diagrammatic view of a device for varying the cross-section of a passage.

Referring to FIG. 1A, the percussion device which may be constructed for use as a hammer drill for mines includes a cylinder 1, a percussion piston 11 slidably mounted in the cylinder 1 to separate a space containing a percussion cushion 10 from a space containing a recoil cushion 20. In addition, the piston 11 has a rod 12 extending therefrom for impacting on a tool holder 15 for driving the holder 15 in an axial direction as indicated by the arrow 13. A suitable sleeve 16 is also provided within the cylinder 1 for guiding the piston rod 12. In addition, suitable seals 7 are provided in the sleeve 16 for sealing engagement about the piston rod 12.

The percussion device also has a drive piston 6 slidably mounted in the cylinder 1 coaxially of the percussion piston 11 and of the same diameter as the percussion piston 11. The drive piston 6 further defines the percussion cushion 10. As indicated, the drive piston 6 has a hollow piston rod 18 which is also slidably mounted within a reduced diameter portion of the cylinder 1. This hollow piston rod 18 defines an internal chamber or recess and slides on the internal surface of the cylinder 1.

The piston rod 18 is driven by a suitable means to be reciprocated with a percussion stroke and a return stroke. For example, the piston rod 18 is connected by a pin 5 to a crank rod 2 of a crank drive in the form of a crank gear. As indicated, the crank rod 2 has a bottom dead center position 21 and a top dead center 22. Further, the crank rod 2 rotates in an orbit 3 in a counterclockwise direction as indicated by the arrow 4.

The drive piston 6 and the piston rod 18 are also sealed relative to the cylinder 1 by suitable sealing rings 7 as indicated.

As indicated, the drive piston 6 is actuated by the crank drive and, via the compression of the percussion air cushion 10, drives the percussion piston 11 and the attached piston rod 12 which is in the form of a ram.

The cylinder 1 is provided with several bypasses 17, 19, 23 as well as with a central air outlet 14.

The central bypass 19 is disposed for connecting the percussion cushion 10 with the recoil cushion 20 in order to deliver at least a part of the percussion cushion 10 to the recoil cushion 20 during a percussion stroke of the drive piston with the percussion piston positioned centrally thereof, as illustrated FIG. 1D.

The central air outlet 14 is positioned for selectively communicating with the percussion cushion 10 (see FIG. 1A) and with the recoil cushion 20 (see FIG. 1C) in order to adjustably vent air from the respective cushions 10, 20.

The second bypass 17 is located in the cylinder 1 for connecting the recoil cushion 20 with the percussion cushion 10 at a predetermined no-load position of the percussion piston 11 (see FIG. 2). This will be further explained below.

The third bypass 23 is located in the cylinder 1 about the top dead center position of the drive piston 6. In this respect, a rear annular surface 8 of the drive piston 6 serves to define an annular chamber with the cylinder 1 for sucking in air via the openings 9 in the piston rod 19 when the bottom dead center 21 is crossed. The sucked in air is compressed during the return stroke and the bypass 23 serves to connect the annular chamber with the percussion cushion 10 during the return stroke just before the top dead center is crossed. During operation, at least the percussion cushion 10 driving in the impact direction 13 is adapted to be pressurized by the drive piston 6 connected to the crank rod 2, while a part of the percussion cushion 10, depending on the percussion travel of the piston 11, is adapted to be supplied via the central bypass 19 past the percussion piston 11 to the recoil cushion 20 which acts on the percussion piston 11 opposite to the direction of percussion 13.

After travel through the top dead center position 21, the annular chamber bounded by the drive piston surface 8 is automatically closed and the air cushion therein is compressed from atmospheric pressure to a number of atmospheres on the way to the bottom dead center position. This pressurizing work is required back from the crank drive during the return from the top dead center position 21 to the bottom dead center position 22. When the bottom dead center position 22 is reached, the outlet opening from the end-position bypass 23 to the percussion cushion 10 is automatically uncovered.

In the position shown in FIG. 1A, the percussion piston 11 is moving against the direction of percussion 13 and has already covered a central air outlet 14, whereas the percussion cushion 10 is additionally precompressed via the end-position bypass 23, until the outlet opening of the end-position bypass 23 is covered by the guided drive piston 6 as shown in FIG. 1B.

As a result of the additional increase of the density in the percussion cushion 10, the cushion acts like an increased work store, since the compression continues as a result of the drive piston 6 moving in the opposite direction to the percussion piston 11 and extends along a higher p.V constant line in a pressure-volume diagram (p.V diagram).

In FIG. 1C, the reversal of motion of the percussion piston 11 has already occurred in the percussion direction 13. The central air outlet 14, which was open during the reversal of motion for the recoil cushion 20, has already closed, the working piston 6 has exceeded its maximum speed in the percussion direction 13, and the percussion cushion 10 has assumed a small volume, and owing to the pre-compression, the loss of pressure with increasing distance between the percussion piston 11 and the working piston 6 is slower. The recoil cushion 20, which was previously vented via the central air outlet 14, exerts a relatively small counter-pressure on the annular surface of the percussion piston 11, starting from atmospheric pressure as the cushion 20 progressively decreases.

In FIG. 1D, the percussion piston 11 has approximately reached its maximum kinetic energy and, considered in time, is shortly prior to striking the tool holder 15, whereas considered in space, the piston 11 is between the connecting openings of a central bypass 19, which makes a connection between the percussion cushion 10 and the recoil cushion 20 depending on the travel of the percussion piston 11. During the short-term bridging, the recoil cushion 20 is additionally charged to a higher pressure, to obtain a stronger spring action for reversing the percussion piston 11 after striking the tool holder 15.

In FIG. 1E, the percussion piston 11 strikes the tool-holder 15. When the percussion piston 11 closes the connecting opening of the central bypass 19 on the side of the recoil cushion 20, the piston 11 simultaneously frees the central air outlet 14 for the percussion cushion 10. Cushion 10 discharges and improves the balance of forces at the percussion piston 11, resulting in a rapid reversal of motion opposite to the direction of percussion 13. The enclosed recoil cushion 10 is additionally compressed until the kinetic energy of the percussion piston 11 is used up and the motion is reversed. The spring action of the recoil cushion 20 and the pressure in the space between the piston rod 12 and tool-holder 15 return the percussion piston 11 to the starting position as per FIG. 1A.

If the tool-holder 15 shown in FIG. 1E is not within the percussion range of piston 11, the reversal of motion has to occur without percussion and under no-load conditions. If there is no percussion, the kinetic energy of the percussion piston 11 is much higher in the direction of percussion 13. The enclosed recoil cushion 20 is compressed much more strongly, until the piston 11 reaches a point of reversal which, as shown in FIG. 2, is much nearer the cylinder sleeve 16. If the recoil cushion 20 were not additionally pressurized via the central bypass 19 as shown in FIG. 1D, the reversal point would be so near the cylinder cover 16 that impacts could occur through contact. However, the spring effect of the recoil cushion 20 is much too great if it can develop over the entire return journey of the percussion piston 11. For this reason, before the percussion piston 11 reaches the reversal point, the piston 11 is bridged by the no-load bypass 17 which has an adjustable flow resistance and which partly relieves the pressure on the recoil cushion 20 towards the percussion cushion 10, as long as each of the two connecting openings of the idling bypass 17 are connected to another air cushion at the cylinder surface.

When the percussion device starts up, after a few cycles, the pressure characteristic which occurs in the percussion cushion 10 and the recoil cushion 20 is repeatable within narrow limits and is dependent on the travel of the percussion piston 11. As shown in FIG. 3, the minimum cross-section of each of the bypasses 17, 19, 23 and the central air outlet 14 is adjustable by means of exchangeable orifice plates 25 each of which has an orifice 27 of a given cross-sectional area for fine adjustment of the throttle effect. As is well known in the art, by removing the plug 29 and the seal 31, an orifice plate 25 having an orifice of a given cross-section may be removed and replaced by an orifice plate having an orifice of a different cross-section. This adjustment may also be accomplished through the use of a needle valve as is well known in the art. The various air cushions are automatically actuated in dependence on the travel of the drive piston 6 and the travel of the percussion piston 11, with the result that the system has a non-linear characteristic, so that cycles can be short and a large amount of power can be transmitted.

Since a number of compression processes at air pressures of several tens of bars occur during each cycle and heat is also produced by friction, cooling is essential in order to control the temperature. If the cooling is intensive, and there is an expansion chamber between the central air outlet 14 and the suction openings 9, a substantially closed air circuit can be used without sucking in fresh air, thus eliminating any contamination of the ambient air.

One special application is to mining, when hand-guided drilling hammers are used for drilling blast holes. The required percussive power here, as compared with manual drilling machines, is so great that the initially-mentioned calculation of overall size, where the mass increases more quickly than the compressive forces, will impose a limit unless other means of increasing the compressive forces are used as in the present invention.

What is claimed is:

1. A percussion device comprising a drive piston;

a chamber formed proximate to the drive piston for receiving ambient air therein;

an overhung percussion piston disposed between a first space facing said drive piston to form a percussion cushion therebetween and a second space to form a recoil cushion therein, said piston having a rod extending therefrom for impacting in a tool holder;

a crank gear for reciprocating said drive piston with a percussion stroke to move towards said percussion piston and a return stroke to move away from said percussion piston, wherein ambient air is drawn into the chamber during the percussion stroke of said drive piston and is subsequently compressed during the return stroke of said drive piston for injection into the percussion cushion;

a central bypass for connecting said first space having said percussion cushion therein with said second space having said recoil cushion therein to deliver at least a part of said percussion cushion to said recoil cushion during said percussion stroke with said percussion piston positioned centrally thereof; and a central air outlet for selectively communicating with said percussion cushion and said recoil cushion to adjustably vent air from said respective cushions.

2. A percussion device as set forth in claim 1 further comprising a cylinder having each said piston slidably mounted therein.

3. A percussion device as set forth in claim 2 wherein each piston is of the same outside diameter as the other piston.

4. A percussion device as set forth in claim 2 wherein said central bypass and said air outlet are formed in said cylinder.

5. A percussion device as set forth in claim 2 which further comprises a second bypass for connecting said recoil cushion with said percussion cushion at a predetermined no-load position of said percussion piston.

6. A percussion device as set forth in claim 5 wherein each bypass and said central air outlet has an adjustable flow resistance.

7. A percussion device as set forth in claim 1 wherein said drive piston has a rear annular surface and said chamber is an annular chamber defined by said annular surface and wherein said percussion device includes a plurality of openings communicating said chamber with ambient air.

8. A percussion device as set forth in claim 1 which further comprises a bypass for connecting said chamber with said percussion cushion during said return stroke of said drive piston.

9. A percussion device as set forth in claim 1 further comprising a cylinder having each said piston slidably mounted therein and having said bypass and said air outlet therein.

10. A percussion device as set forth in claim 9 wherein said bypass and said outlet are adjustable via a valve action between said cylinder and a surface of said percussion piston.

11. A percussion device as set forth in claim 10 wherein said drive piston has a rear annular surface to define an annular chamber with said piston and a hollow piston with said piston and a hollow piston rod having a plurality of openings communicating said chamber with ambient air within said rod which further comprises a bypass for connecting said annular chamber with said percussion cushion during said return stroke of said drive piston.

12. A percussion device as set forth in claim 11 wherein said second bypass is adjustable via a valve action between said cylinder and a surface of said drive piston and said openings in said piston rod are adjustable via a valve action of said piston rod with said cylinder.

13. A hammer drill comprising a cylinder;

a percussion piton slidably mounted in said cylinder to separate a percussion cushion from a recoil cushion on opposite sides thereof, said piston having a rod extending therefrom for impacting on a tool holder;

a drive piston slidably mounted in said cylinder coaxially of said percussion piston to define said percussion cushion therebetween;

a chamber formed proximate to the drive piston for receiving ambient air therein;

a crank gear for reciprocating said drive piston with a percussion stroke to move towards said percussion piston and a return stroke to move away from said percussion piston, wherein ambient air is drawn into the chamber during the percussion stroke of said drive piston and is subsequently compressed during the return stroke of said drive piston for injection into the percussion cushion;

a central bypass in said cylinder for connecting said percussion cushion with said recoil cushion to deliver at least part of said percussion cushion to said recoil cushion during said percussion stroke with said percussion piston positioned centrally thereof; and a central air outlet in said cylinder for selectively venting each cushion.

14. A percussion device comprising a cylinder;

a percussion piton slidably mounted in said cylinder to separate a percussion cushion from a recoil cushion on opposite sides thereof, said piston having a rod extending therefrom for impacting on a tool holder;

a drive piston slidably mounted in said cylinder coaxially of said percussion piston to define said percussion cushion therebetween;

a chamber formed proximate to the drive piston for receiving ambient air therein;

a crank gear for reciprocating said drive piston with a percussion stroke to move towards said percussion piston and a return stroke to move away from said percussion piston, wherein ambient air is drawn into the chamber during the percussion stroke of said drive piston and is subsequently compressed during the return stroke of said drive piston for injection into the percussion cushion;

a central bypass in said cylinder for connecting said percussion cushion with said recoil cushion to deliver at least part of said percussion cushion to said recoil cushion during said percussion stroke with said percussion piston positioned centrally thereof.

15. A percussion device as set forth in claim 14 which further comprises a second bypass for connecting said recoil cushion with said percussion cushion at a predetermined no-load position of said percussion piston.

16. A percussion device as set forth in claim 15 wherein said drive piston defines an annular chamber with said cylinder on a side opposite said percussion cushion and which further comprises a third bypass for connecting said annular chamber with said percussion cushion during said return stroke of said drive piston.

17. A percussion device as set forth in claim 16 wherein said drive piston has a hollow piston rod defining a recess and including a plurality of radially disposed openings to communicate said annular chamber with said recess in response to said drive piston completing said percussion stroke.

* * * * *

UNITED STATES PATENT AND TRADEMARK OFFICE

CERTIFICATE OF CORRECTION

PATENT NO. : 5,161,623

DATED : November 10, 1992

INVENTOR(S) : Erlach

It is certified that error appears in the above-indentified patent and that said Letters Patent is hereby corrected as shown below:

Column 3, line 50, change "19" to --18--;

Column 7, line 3, change "piton" to --piston--; and

Column 7, line 31, change "piton" to --piston--.

Signed and Sealed this

Fifth Day of April, 1994

Attest:

BRUCE LEHMAN

Attesting Officer

Commissioner of Patents and Trademarks